United States Patent [19]
Hirakata et al.

[11] Patent Number: 6,133,970
[45] Date of Patent: Oct. 17, 2000

[54] LIQUID CRYSTAL DISPLAY DEVICE

[75] Inventors: Junichi Hirakata, Chiba; Toru Sasaki; Junichi Ohwada, both of Mobara, all of Japan

[73] Assignee: Hitachi, Ltd., Tokyo, Japan

[21] Appl. No.: 09/288,030

[22] Filed: Apr. 8, 1999

[30] Foreign Application Priority Data

Apr. 9, 1998 [JP] Japan ................................. 10-097648

[51] Int. Cl.⁷ ........................ G02F 1/1347; G02F 1/1335
[52] U.S. Cl. ................ 349/75; 349/117; 349/63
[58] Field of Search ............................... 349/117, 61, 75, 349/63, 78, 141, 151

[56] References Cited

U.S. PATENT DOCUMENTS 5,519,523 5/1996 Madokoro .
5,659,411 8/1997 Nito et al. ................................. 349/117
5,975,703 11/1999 Holman et al. ............................ 353/20

*Primary Examiner*—Akm E. Ullah
*Attorney, Agent, or Firm*—Antonelli, Terry, Stout & Kraus, LLP

[57] ABSTRACT

A liquid crystal display has excellent viewing angle characteristics and prevents any reduction of transmittance. A liquid crystal panel has a pair of substrates SUB1, SUB2 sandwiching a liquid crystal layer LC, at least one of the substrates having electrodes DTM for selecting pixels, polarizing plates POL1, POL2 disposed on both sides of the liquid crystal panel to control the transmitted light depending on the state of orientation of liquid crystal molecules by applying a voltage to the electrodes, illumination means BL for illuminating the liquid crystal panel, a driving circuit for applying a voltage in accordance with a display image to the electrodes, and birefringent sheet PDS formed on the outer surface of one of the pair of substrates SUB1 and SUB2 such that the direction of the maximum contrast or luminance becomes the vertical direction and such that viewing angle characteristics become symmetric in the horizontal direction, wherein the liquid crystal layer LC is oriented such that the transmittances of the liquid crystal panel in use in the vertical direction and horizontal direction have asymmetric viewing angle dependence and such that the direction of the maximum contrast or luminance is a direction different from either of the vertical and horizontal directions.

13 Claims, 12 Drawing Sheets

LIQUID CRYSTAL DISPLAY DEVICE

BACKGROUND OF THE INVENTION (1) Field of the Invention

The present invention relates to liquid crystal displays and, more particularly, to a liquid crystal display having preferable viewing angle characteristics which has less variation in the contrast ratio, the luminance of transmitted light and tone attributable to changes in the viewing angle.

(2) Description of the Prior Art

Liquid crystal displays are widely used as displays capable of high definition color display for notebook type computers and display monitors.

Conventional liquid crystal displays include the so-called vertical field type liquid crystal displays utilizing a liquid crystal panel having a group of electrodes for pixel selection formed on each of a pair of upper and lower substrates represented by the twisted nematic (TN) type (generally referred to as "TN type liquid crystal displays") and the so-called horizontal field type liquid crystal displays utilizing a liquid crystal panel having a group of electrodes for pixel selection formed only on one of a pair of upper and lower substrates (generally referred to as "IPS type liquid crystal displays").

In the case of a liquid crystal panel forming a part of the former, i.e., the TN type liquid crystal display, liquid crystal is oriented at a twist of 90° within a pair of (two) substrates, and two polarizing plates which are in the crossed Nicols configuration in the direction of the absorption axes and whose absorption axes at the entrance side are in parallel with or orthogonal to the rubbing direction are formed on the outer surface of the upper and lower substrates of the liquid crystal panel. When the rubbing direction and the absorption axes of the polarizing plates are in parallel with each other, such a state is referred to as "O" mode and, when they are perpendicular, the state is referred to as "E" mode.

In such a TN type liquid crystal display, incident light is transformed into linearly polarized light by the polarizing plate at the entrance side when no voltage is applied; the linearly polarized light propagates along the twist of the liquid crystal layer; the linearly polarized light is entirely emitted to show white display if the transmission axis of the polarizing plate at the exit side coincides with the azimuth angle of the linearly polarized light (the so-called normally open configuration).

When a voltage is applied, the direction of the unit vector (director) indicating an average direction of aligenment of the molecular axes of liquid crystal forming the liquid crystal layer is perpendicular to the surface of the substrates. There is no change in the azimuth angle of the linearly polarized light at the entrance side, and it therefore coincides with the absorption angle of the polarizing plate at the exit side to show black display (see "Principles and Applications of Liquid Crystal" issued by Institute of Industrial Research in 1991).

In an IPS type liquid crystal display in which a group of electrodes for pixel selection are formed on only one of a pair of substrates and a voltage is applied between adjoining electrodes on the substrate (between a pixel electrode and a counter electrode) to switch the liquid crystal layer in the direction parallel with the surface of the substrates, polarizing plates are provided such that black display appears when no voltage is applied (the so-called normally closed configuration).

The liquid crystal layer in such an IPS liquid crystal display is in homogeneous orientation in which it is in parallel with the substrate surface in the initial state and, in a plane parallel with the substrate, the director of the liquid crystal layer is in parallel with or at some angle to the direction in which the electrodes are provided when no voltage is applied. When a voltage is applied, the direction of the director of the liquid crystal layer changes to a direction perpendicular to the direction in which the electrodes are provided as the voltage is applied. When the direction of the director in the liquid crystal layer is inclined at 45° toward the direction in which the electrodes are provided compared to the direction of the director with no voltage applied thereto, the liquid crystal layer during the application of a voltage causes the azimuth angle of polarized light to rotate at 90° as if it is a ½ wavelength plate, which causes the transmission axis of the exit side polarizing plate and the azimuth angle of the polarized light to coincide thereby resulting in white display.

The IPS type liquid crystal display is characterized in that it is subjected to less variation in hue and contrast depending on the field angle and therefore allows wider field angles (see Japanese unexamined patent publication No. H5-505247).

SUMMARY OF THE INVENTION

In both of the above-described TN type liquid crystal display and IPS type liquid crystal display, a polarizing plate is formed on each of the front and rear surfaces of a liquid crystal panel in which a liquid crystal layer is sandwiched by a pair of substrates. Two polarizing plates are used to sandwich a liquid crystal layer not only in the above-described two types but also in all other liquid crystal displays which display in interference colors including, for example, STN (super twisted nematic) type liquid crystal displays (the so-called simple matrix type liquid crystal displays) having a twist angle of 180° or more, ODB (optical compensated birefringence) type liquid crystal displays having no twist in the liquid crystal layer, vertical alignment type and liquid crystal displays utilizing ferroelectric liquid crystal.

However, those liquid crystal displays excluding IPS type liquid crystal displays have had a problem in that they are subjected to significant changes in transmittance and displayed colors when the display screen is viewed at an angle, in that inversion occurs between adjacent gray scale levels in the case of gray shades display and in that variation occurs in intermediate hues in the case of color display.

Further, although the IPS liquid crystal display is characterized in that it has quite small variation in contrast, tone, and the viewing angle direction of gray shades display, it has had a problem in that the tone slightly varies in the horizontal direction.

In various liquid crystal displays as described above, a sheet of a birefringent medium is formed on each of the front and rear surfaces of the liquid crystal layer especially in order to improve viewing angle characteristics for black display when a voltage is applied. However, one such sheet of a birefringent medium has a large thickness, and this has resulted in a problem in that transmittance is significantly reduced to place a limit on the improvement of brightness when two such sheets are provided.

It is an object of the present invention to solve the above-described problems with the prior art and to provide a liquid crystal display in which reduction of transmittance is suppressed and which has excellent viewing angle characteristics.

The present invention is characterized in that it provides configurations according to items (1) through (10) described below in order to achieve the above-described object.

(1) There is provided a liquid crystal panel formed by sandwiching a liquid crystal layer between a pair of substrates provided in a face-to-face relationship at least one of which has a group of electrodes for selecting pixels and at least one of which is transparent, a polarizing plate formed on said liquid crystal panel to control the quantity of transmitted light that depends on changes in the :state of orientation of liquid crystal molecules forming said liquid crystal layer caused by applying a voltage to said group of electrodes, an illumination means for illuminating said liquid crystal panel and driving circuit means for applying a voltage waveform in accordance with a display signal to said electrodes.

Said liquid crystal layer is oriented such that transmittances of said liquid crystal panel in use in the vertical direction and horizontal direction have asymmetric dependency on a viewing angle and such that the direction of the maximum contrast or luminance is a direction different from either of the vertical and horizontal directions and in that it includes a sheet of a birefringent medium formed on the outer surface of one of said pair of substrates such that said direction of the maximum contract or luminance becomes the vertical direction and such that viewing angle characteristics become symmetric in the horizontal direction.

(2) Said sheet of a birefringent medium is formed on the outer surface of one of said pair of substrates to compensate for a phase difference equal to or greater than the half of the thickness of the liquid crystal layer whose state of orientation changes as a result of the application of said voltage waveform as mentioned in (1).

(3) In the arrangement per (1) or (2), said orientation process defines the direction of orientation of the liquid crystal molecules forming said liquid crystal layer in the vicinity of each of said pair of substrates and said direction of orientation is varied in the vicinity of each of said pair of substrates to provide the liquid crystal molecules forming said liquid crystal layer with a twisted structure.

(4) There is provided a liquid crystal panel formed by sandwiching a liquid crystal layer between a pair of substrates provided in a face-to-face relationship at least one of which has a group of electrodes for selecting pixels and at least one of which is transparent, a polarizing plate formed on said liquid crystal panel to control the quantity of transmitted light that depends on changes in the state of orientation of liquid crystal molecules forming said liquid crystal layer caused by applying a voltage to said group of electrodes, an illumination means for illuminating said liquid crystal panel and driving circuit means for applying a voltage waveform in accordance with a display signal to said electrodes.

Said orientation process defines the direction of orientation of the liquid crystal molecules forming said liquid crystal layer in the vicinity of each of said pair of substrates and said direction of orientation is varied in the vicinity of each of said pair of substrates to provide the liquid crystal molecules, forming said liquid crystal layer with a twisted structure.

Said twist angle $\theta$ is 60°–100°; the product and of the anisotropy $\Delta n$ of the refractive index and the thickness d of said liquid crystal layer is 0.2 $\mu$m–0.5 $\mu$m; and a relationship $\Delta nd*0.9<0.004X\ \theta+0.0076<\Delta nd*1.1$ is satisfied.

The axes of polarization of said pair of polarizing plates are substantially orthogonal to show white display when no voltage is applied.

An orientation process is provided such that transmittances of said liquid crystal panel in use in the vertical direction and horizontal direction have asymmetric viewing angle dependence and such that the direction of the maximum contrast or luminance is a direction different from either of the vertical and horizontal directions.

A sheet of a birefringent medium is formed on the outer surface of one of said pair of substrates such that said direction of the maximum contract or luminance becomes the vertical direction and such that viewing angle characteristics become symmetric in the horizontal direction.

(5) In the arrangement per (1) or (4), the direction of orientation of said liquid crystal layer and the direction of a main optical axis of said sheet of a birefringent medium are arranged such that viewing angle variation of said liquid crystal panel and viewing angle variation of said sheet of a birefringent medium in any viewing angle direction are in the relationship between complementary colors.

(6) When $\Delta n$ represents the anisotropy of the refractive index of said sheet of a birefringent medium per (1) or (4) and d represents the thickness of the same, the product $\Delta nd$ is within the range from 10 nm to 200 nm and relationships:

$$0.99<nx/ny<1.01 \text{ or } 0.99<ny/nx<1.01$$

$$0.9<nx/ny<1 \text{ or } 0.9<ny/nz<1$$

are satisfied where nx and ny represent the refractive indices in the direction of the plane thereof and nz represents the refractive index in the direction of the thickness thereof.

(7) Said sheet of a birefringent medium is provided such that the direction of a unit vector indicating an average direction of the molecular axes of the liquid crystal of said liquid crystal layer when a voltage is applied to said electrodes as mentioned in (1) or (4) is oriented in the direction of an electric field generated by said applied voltage and such that the direction of said unit vector and the optical axis of said sheet of a birefringent medium are orthogonal.

(8) The optical axis direction of the refractive index of said sheet of a birefringent medium in the thickness direction per (6) has a gradient and the magnitude of the same is within the range from 5 to 35° to the direction vertical to the plane of said substrate.

(9) In the arrangement per (1), the twist angle $\theta$ of said liquid crystal layer is 60°–100°; the product $\Delta nd$ of the anisotropy $\Delta n$ of the refractive index and the thickness d of said liquid crystal layer is 0.2 $\mu$m–0.5 $\mu$m; and a relationship $\Delta nd*0.9<0.004 X\ \theta+0.0076<\Delta nd*1.1$ is satisfied.

(10) In the arrangement per (1) or (4), one pixel is divided into a plurality of orientation regions having a viewing angle direction.

With the configurations according to the invention described above, for example, the direction of the maximum contrast of a TN type liquid crystal display will be the direction of 12 o'clock (upward direction), and it will have symmetric horizontal viewing angle characteristics. Further, by compensating for the viewing angle dependence of the luminance of black display when no voltage is applied by providing a sheet of birefringent medium in each of gaps between a liquid crystal panel and polarizing plates, the viewing angle dependence of contrast can be greatly improved. At this time, the direction of the maximum contrast is the direction of 12 o'clock, and horizontal viewing angle characteristics are symmetrical and subjected to no change. However, there is a reduction of about 5% in transmittance.

Then, the field angle is improved without reduction in transmittance by providing one sheet of a birefringent medium between the liquid crystal panel and polarizing plate, i.e., one sheet of a birefringent medium whose $\Delta nd$ is 80 nm. When this sheet of a birefringent medium is provided in the same rubbing direction as in the normal TN system, viewing angle characteristics become asymmetrical (direction of half past seven) in each of the vertical and horizontal directions. This can be solved by setting a rubbing direction such that the viewing angle direction of a liquid crystal panel alone becomes the direction of half past seven to control the viewing angle direction after the formation of a sheet of a birefringent medium toward 12 o'clock or 6 o'clock.

The viewing angle direction can be controlled not only through definition of the rubbing direction but also by dividing one pixel into a plurality of orientation regions having a viewing angle.

The sheet of a birefringent medium is provided on either of the outer sides of a liquid crystal layer (in practice, the front or rear surface of a substrate), and Δnd of the same is set in the vicinity of a magnitude to compensate for a phase difference equal to or greater than the half of the thickness of the state of orientation of the liquid crystal layer to which a voltage waveform is applied.

Especially, it has been empirically proved that this configuration of the sheet of a birefringent medium is significantly effective where the liquid crystal layer has a twisted structure; the twist angle θ is 60°–100°; the product Δnd of the anisotropy Δn of the refractive index and the thickness d of said liquid crystal layer is 0.2 μm–0.5 μm; and a relationship Δnd*0.9<0.004 X θ+0.0076<Δnd*1.1 is satisfied.

Referring to the direction in which the optical axis of the sheet of a birefringent medium is arranged, the direction of orientation and the optical, axis of the sheet of a birefringent medium are arranged such that viewing angle variation of the liquid crystal panel and viewing angle variation of the polarizing plates in any viewing angle direction are in the relationship between complementary colors. Alternatively, an arrangement is made such that the direction of a unit vector indicating an average direction of the molecular axes of liquid crystal when a voltage is applied to the electrodes of the liquid crystal panel is oriented in the range direction of an electric field generated by the applied voltage and such that the direction of said unit vector and the optical axis of the sheet of a birefringent medium are orthogonal.

Viewing angle variation of contrast is mitigated and viewing angle dependence in the horizontal direction becomes symmetrical when product Δnd is within the range from 10 nm to 200 nm where Δn represents the anisotropy of the refractive index of the sheet of a birefringent medium and d represents the thickness of the same; relationships:

$0.99 < nx/ny < 1.01$ or $0.99 < ny/nx < 1.01$ $0.9 < nx/ny < 1$ or $0.9 < ny/nz < 1$ are satisfied where nx and ny represent the refractive indices in the direction of the plane thereof and nz represents the refractive index in the direction of the thickness thereof; and the optical axis direction of the refractive index of the sheet of a birefringent medium has a gradient having a magnitude within the range from 5 to 35° to the direction vertical to the plane of the substrate.

DESCRIPTION OF THE PREFERRED EMBODIMENTS

Modes for carrying out the invention will now be described in detail with reference to embodiments thereof.

[First Embodiment]

Figure 1:
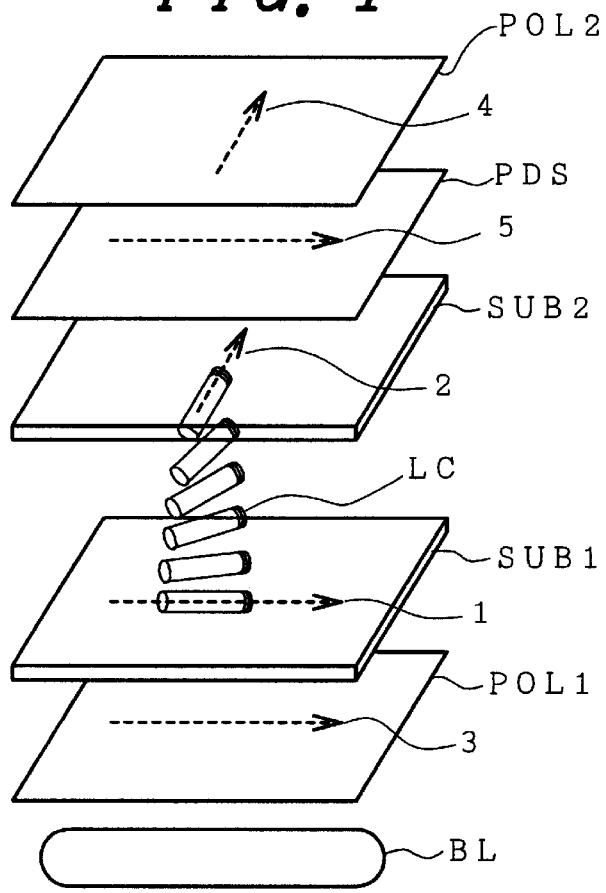
FIG. 1 is an exploded schematic view for explaining an example of a structure of an embodiment of a liquid crystal display according to the present invention.
Figure 2:
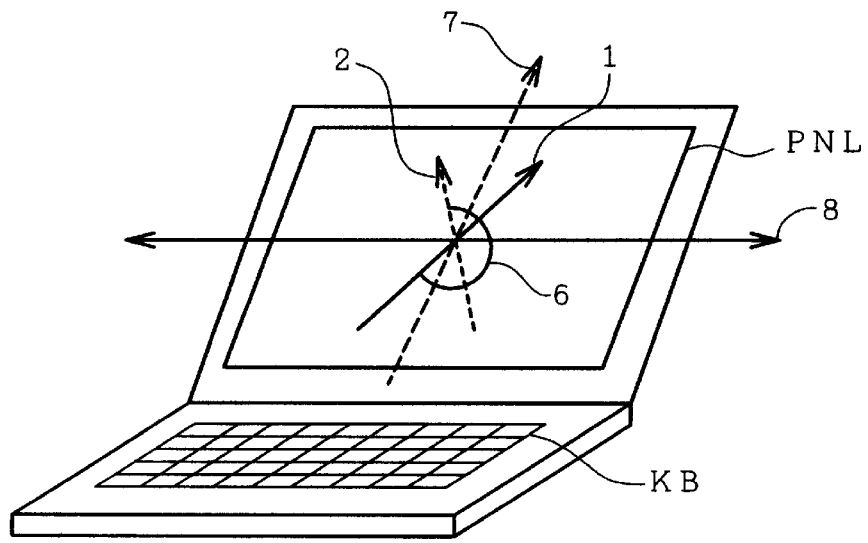
FIG. 2 is an external view of a personal computer for explaining a viewing angle direction of a liquid crystal display according to the present invention.
Figure 3:
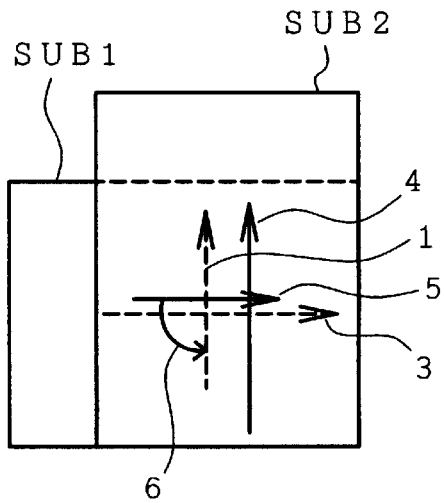
FIG. 3 shows an arrangement of an optical axis of a liquid crystal display according to the present invention.

FIG. 1 is a schematic exploded view for explaining an example of the structure of an embodiment of a liquid crystal display according to the present invention. FIG. 2 is an external view of a personal computer for explaining the viewing angle direction of the liquid crystal display according to the invention. FIG. 3 illustrates an arrangement of the optical axis of the liquid crystal display according to the invention.

In FIG. 1, a liquid crystal panel is formed by sandwiching a liquid crystal layer LC between a lower substrate SUB1 and an upper substrate SUB2; a lower polarizing plate POL1 is formed on the outer surface of the lower substrate SUB1; and an upper polarizing plate POL2 is formed on the outer surface of the upper substrate SUB2. A sheet of a birefringent medium PDS is interposed between the upper substrate SUB2 and the upper polarizing plate POL2.

A back light BL for illumination is provided on the side of the lower substrate SUB1 at the rear surface of the liquid crystal panel.

The lower and upper substrates SUB1, SUB2 are glass substrates, and a polycarbonate film is used as the birefringent medium PDS provided on the side of the upper polarizing plate POL2. There is a phase difference of 40–80 nm between them. G1220DU (product name) manufactured by NITTO DENKO CORPORATION is used as the lower and upper polarizing plates POL1, POL2. The back light BL is constituted by a 3-wavelength cold-cathode fluorescent tube at 5100 Kelvin.

As shown in FIG. 2 and FIG. 3, 1 represents the rubbing direction of the lower substrate; 2 represents the rubbing direction of the upper substrate; 3 represents the transmission axis of the lower polarizing plate; 4 represents the transmission axis of the upper polarizing plate; 5 represents the optical axis of the birefringent medium (phase-lag axis); 6 represents the twist angle of liquid crystal; 7 represents the sum of vectors in the rubbing directions of the upper and lower substrates; and 8 represents left and right viewing angle directions.

In a liquid crystal panel PNL mounted on an information equipment such as a personal computer as shown in FIG. 2, the sum of vectors in the rubbing directions of the upper and lower substrates in use is set in the vertical direction, and the optical axis 5 of the birefringent medium PDS is orthogonal to the rubbing direction 5 of the upper substrate SUB2.

When it is defined that the upward, right, downward and left directions are the directions of 12 o'clock, 3 o'clock, 6 o'clock and 9 o'clock, respectively in use as shown in FIG. 2, the direction of the maximum contrast and transmittance is the direction of 6 o'clock, and the left and right directions (the directions of 3 o'clock and 9 o'clock) are substantially symmetric.

Figure 4:
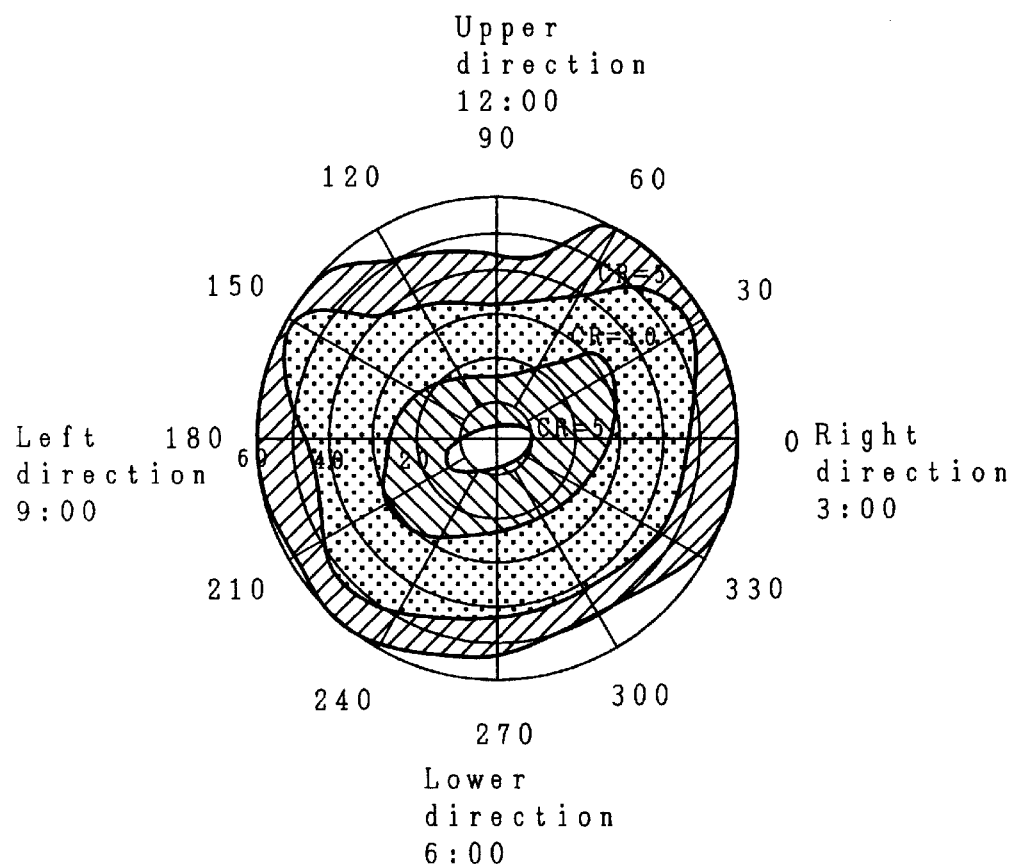
FIG. 4 illustrates an iso-contrast curve of a liquid crystal display according to the present invention.

FIG. 4 shows an iso-contrast curve of a liquid crystal display according to the present invention. This figure indicates that the range in which the contrast ratio (CR) is 10:1 or more is 80° in the vertical direction and 100° or more in the horizontal direction.

While the twist angle (θ) is 90° here, the same result can be achieved within the range from 30° to 100°. The field angles in the vertical and horizontal directions are expanded by reducing the twist angle.

A comparative example will now be described to explain the effect of the above-described embodiment of the invention.

[Comparative Example 1]

The comparative example 1 is configured by removing the sheet of a birefringent medium PDS from the liquid crystal panel shown in FIG. 1.

Figure 5:
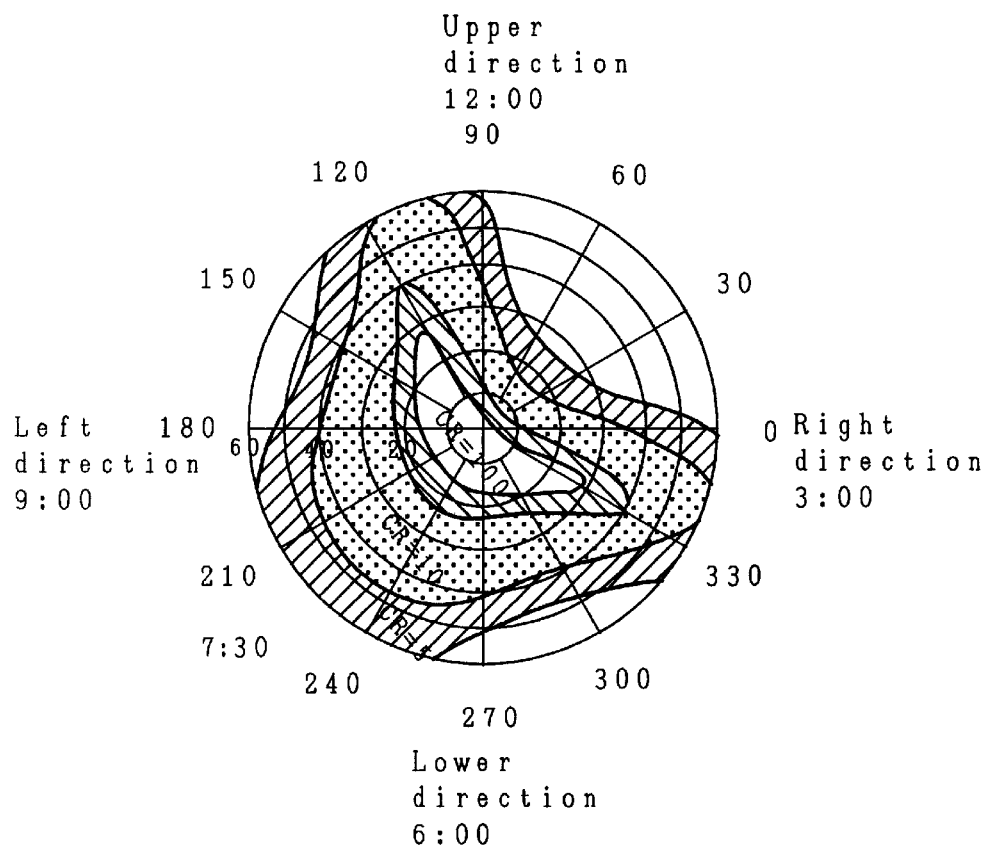
FIG. 5 illustrates an iso-contrast curve of viewing angle characteristics of a liquid crystal display according to a comparative example 1.

FIG. 5 shows an iso-contrast curve of viewing angle characteristics of a liquid crystal display as the comparative example 1. This figure indicates that the direction of the maximum contrast and transmittance is the direction of half past seven and that the left and right viewing angle characteristics are asymmetric.

[Comparative Example 2]

Figure 6:
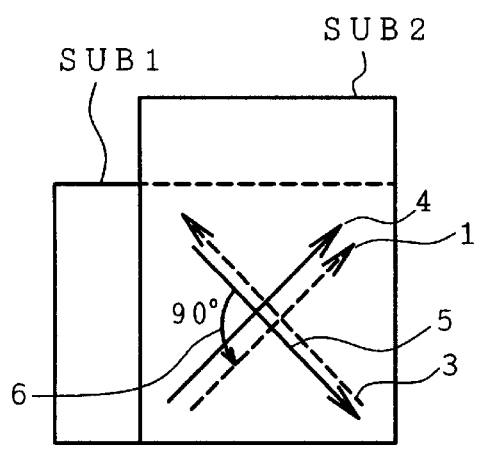
FIG. 6 illustrates an arrangement of an optical axis of the liquid crystal display according to the comparative example 2.

FIG. 6 illustrates an arrangement of the optical axis of a liquid crystal display as a comparative example 2. In this example, the rubbing direction 1 of the lower substrate SUB1 is the direction of half past one; the transmission axis 3 of the lower polarizing plate POL1 is in the direction of half past ten; the transmission axis 4 of the upper polarizing plate POL2 is in parallel with the rubbing direction of the lower substrate SUB1; the rubbing direction 5 of the upper substrate SUB2 is the direction of half past four; and the twist angle 6 of the liquid crystal LC is set at 90°.

Figure 7:
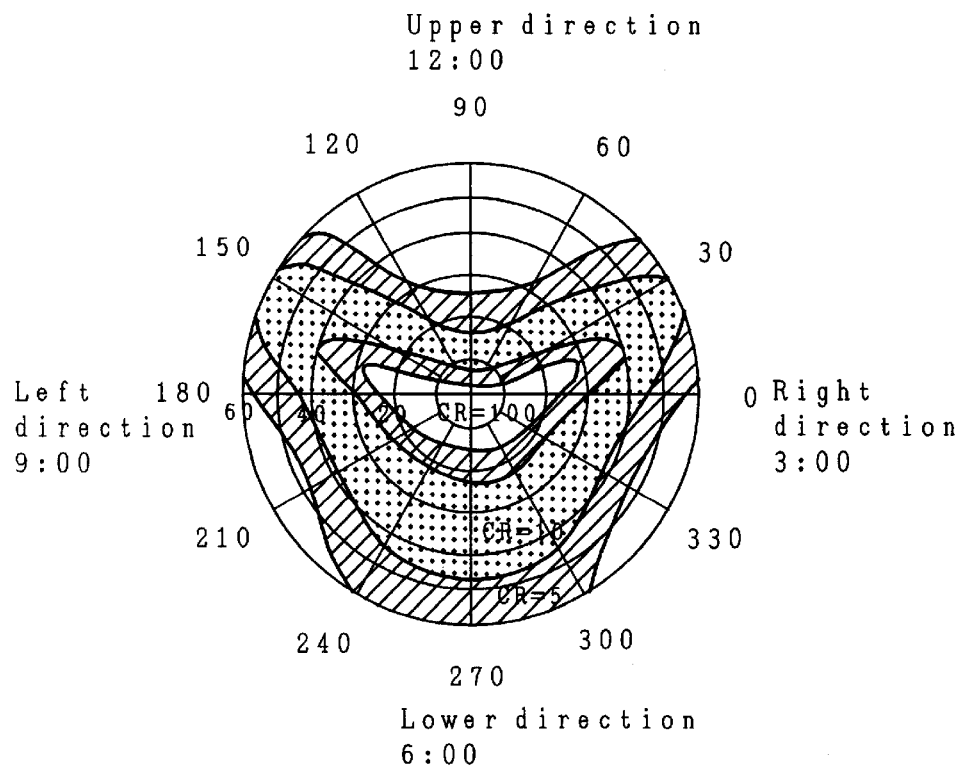
FIG. 7 illustrates an iso-contrast curve of viewing angle characteristics of the liquid crystal display according to a comparative example 2.

FIG. 7 shows an iso-contrast curve of viewing angle characteristics of a liquid crystal display as the comparative example 2. This figure indicates that the direction of the maximum contrast and transmittance is the direction of six o'clock; the left and right viewing angle characteristics are symmetric; and the range in which the contrast ratio (CR) is 10:1 or more is 50° in the vertical direction and 80° in the horizontal direction.

[Comparative Example 3]

The comparative example 3 has the same arrangement of the optical axis as that of the liquid crystal display as the comparative example 2 and includes the same sheet of a birefringent medium 3 as that in FIG. 1.

Figure 8:
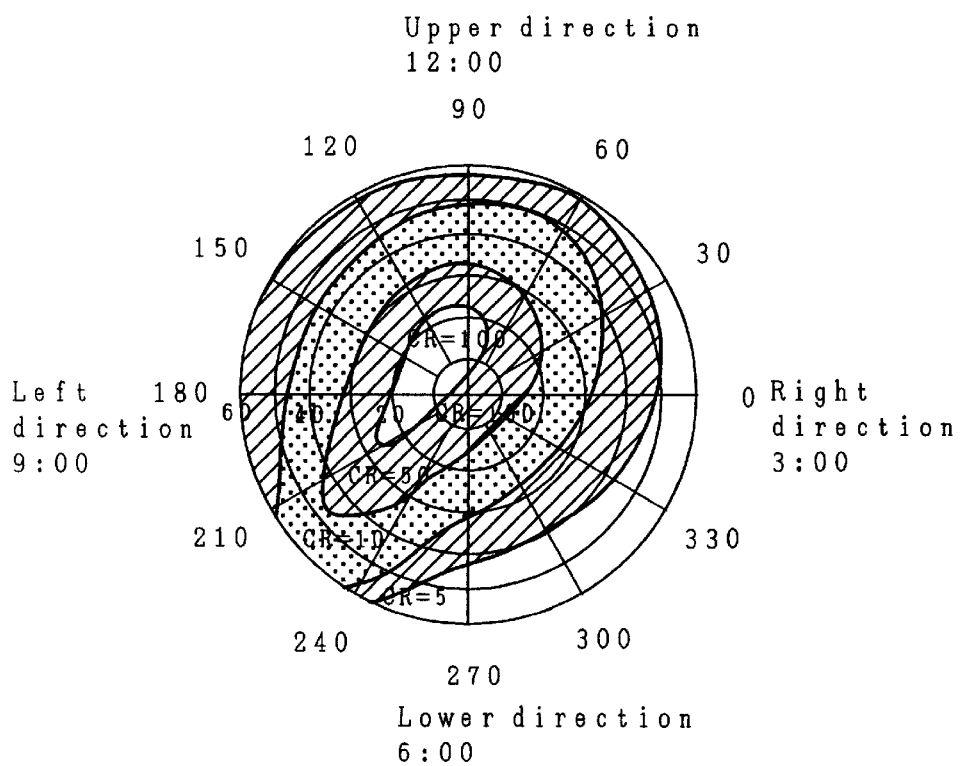
FIG. 8 illustrates an iso-contrast curve of viewing angle characteristics of the liquid crystal display according to a comparative example 3.

FIG. 8 shows an iso-contrast curve of viewing angle characteristics of a liquid crystal display as the comparative example 3. While this figure indicates that the left and right viewing angle characteristics are symmetric and that the range in which the contrast ratio (CR) is 10:1 or more is 80° in the vertical direction and 80° in the horizontal direction, the direction of the maximum contrast and transmittance is the direction of half past seven in which the left and right viewing angle characteristics are asymmetric.

A comparison between the embodiment of the invention and the comparative examples 1 through 3 indicates that the embodiment of the invention makes it possible to provide a liquid crystal display in which the range of a contrast ratio (CR) of 10:1 or more in the horizontal direction is 80° in the vertical direction and 10° or more in the horizontal direction and which has wide viewing angles in vertical and horizontal directions.

An example of a specific configuration of a liquid crystal display employing the present invention will now be described.

Figure 9:
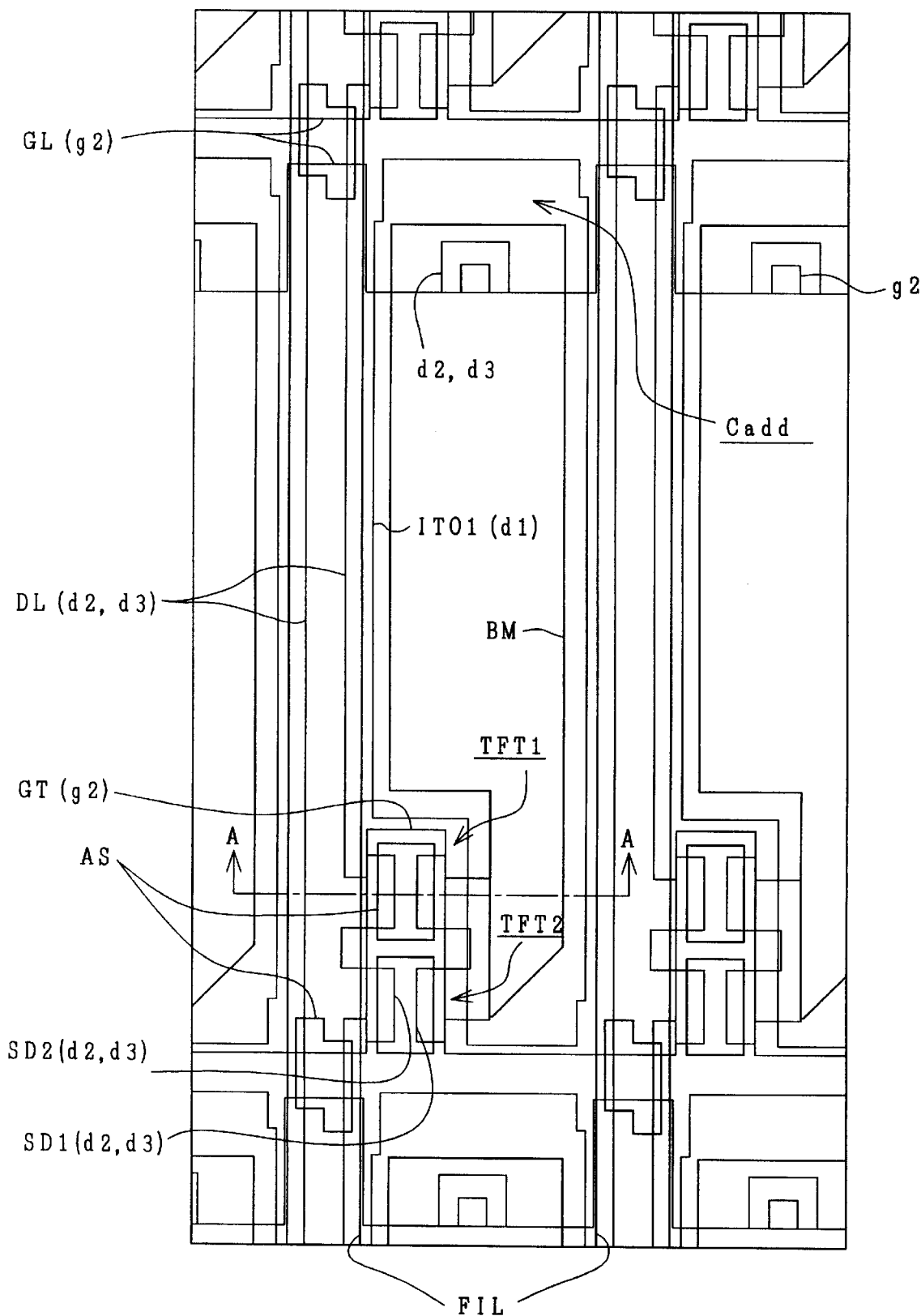
FIG. 9 is a plan view for explaining one pixel and a configuration around the same in a TN type liquid crystal display which is a liquid crystal display employing the present invention.
Figure 10:
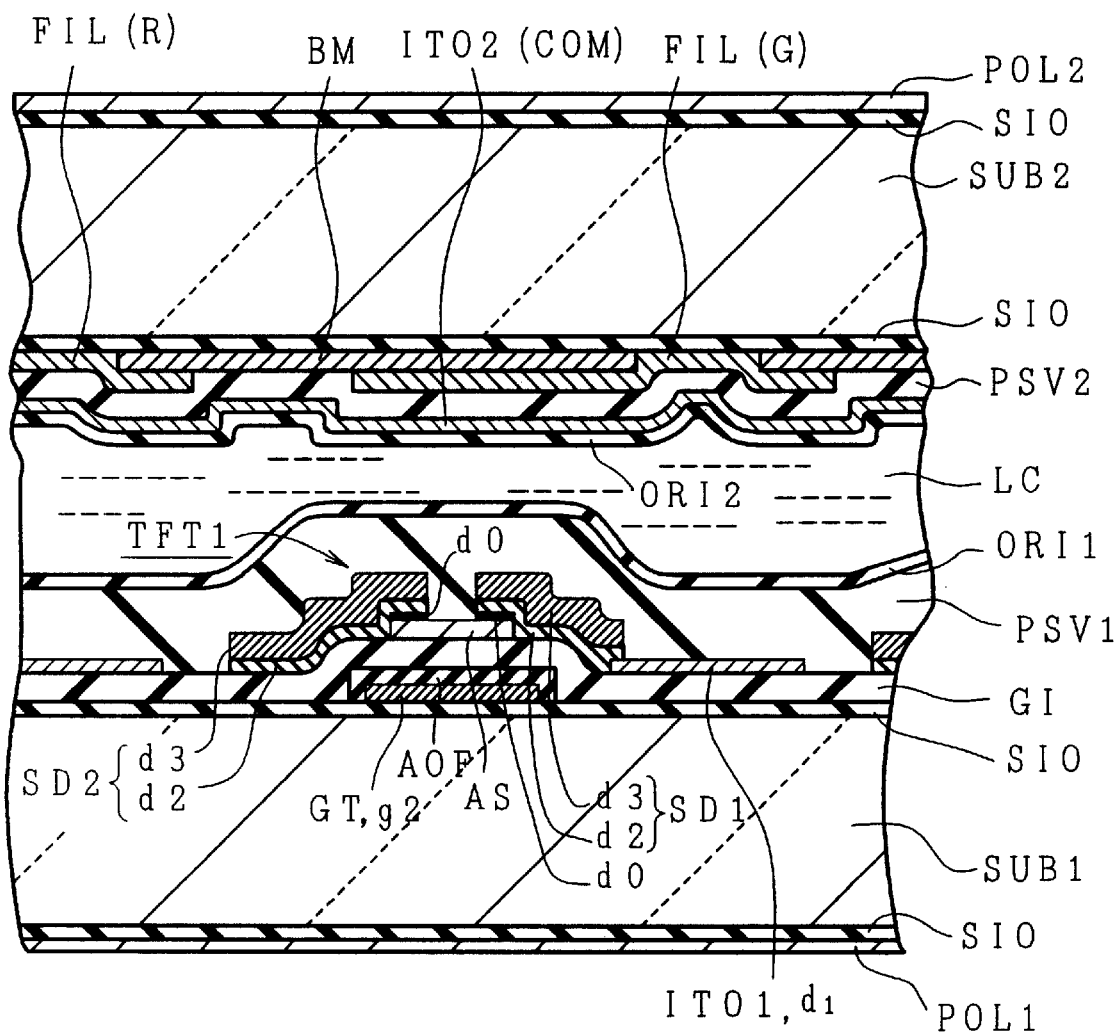
FIG. 10 is a sectional view taken along the line A—A' in FIG. 9.

FIG. 9 is a plan view for explaining one pixel and a configuration around the same in a TN type liquid crystal display which is an example of a liquid crystal display employing the present invention, and FIG. 10 is a sectional view taken along the line A—A' in FIG. 9. As shown in FIG. 9, each pixel is disposed in a region where adjoining two scan signal lines (gate signal lines or horizontal signal lines) GL and adjoining two image signal lines (drain signal lines or vertical signal lines) DL cross each other (in a region surrounded by four signal lines).

Each pixel includes a thin film transistor TFT, a transparent pixel electrode ITO1 and a retention capacitive element Cadd. The scan signal lines GL extend in the direction of the rows, and a plurality of the same are provided in the direction of the columns. The image signal lines DL extend in the direction of the columns, and a plurality of the same are provided in the direction of the rows.

As shown in FIG. 10, the thin film transistor TFT and transparent pixel electrode ITO1 are formed closer to the lower substrate SUB1 relative to the liquid crystal LC as a reference, and a color filter FIL and a black matrix pattern BM for shading are formed closer to the upper substrate SUB2. The upper and lower substrates SUB2, 1 have a thickness of, for example, about 0.7 mm or 1.1 mm and have silicon oxide films SIO on both sides thereof formed using a dip process or the like. Therefore, even if there are small scratches on the surface of the lower and upper substrates SUB1, SUB2, they can be flattened by the coating of the silicon oxide film SIO to maintain uniform film quality of the scan signal lines GL, shading film (black matrix) BM and the like formed thereon.

The shading film BM, color filter FIL and an upper orientation film OR12 are sequentially formed on the inner surface (toward the liquid crystal LC) of the upper substrate SUB2. The sheet of a birefringent medium SPD is interposed between the upper substrate SUB2 and upper polarizing plate POL2.

The color filter FIL is formed by applying a dye to a dye base formed from a resin material such as acrylic resin. The color filter FIL is formed and colored in the form of stripes in a position where it face the pixels. The shading film BM is formed inside the periphery of the transparent pixel electrode IT01 in an overlapping relationship with the edges of the color filter FIL and transparent pixel electrode ITO1.

The color filter FIL may also be formed as follows. First, a dye base is formed on the surface of the upper substrate SUB2, and the dye base is removed using photolithography except in a region where a red filter is to be formed. Thereafter, the dye base is colored using a red dye and is subjected to a fixing process to form a red filter R. Next, the same step is performed to form a green filter G and a blue filter B sequentially.

Figure 11:
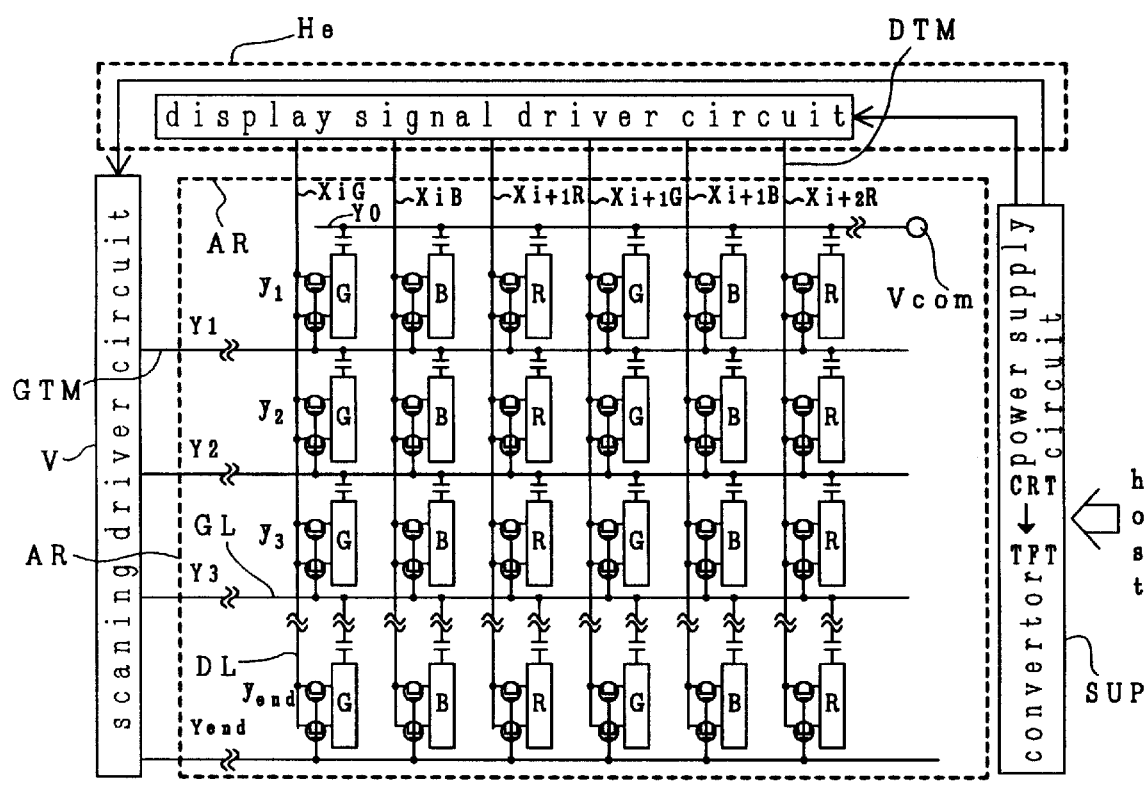
FIG. 11 shows a connection diagram for an equivalent circuit and circuit around the same of the liquid crystal display shown in FIG. 9.

FIG. 11 is a connection diagram for an equivalent circuit of the liquid crystal display shown in FIG. 9 and peripheral circuits therefor. While this figure is a circuit diagram, it is drawn in correspondence to an actual geometrical arrangement. AR represents a matrix array which is a two-dimensional array of a plurality of pixels.

In the figure, X means the image signal line DL, and the suffixes G, B and R are added in association with green, device and red pixels. Y means the scan signal line GL, and the suffixes 1, 2, 3, . . . , end are added in accordance with the order of scan timing.

The image signal lines X (suffix is omitted here) are connected to an upper image signal driving circuit He. Specifically, terminals for the image signal lines X are led out at only one side of the image signal panel PNL as for the scan signal lines Y The scan signal lines Y (suffix is omitted here) are connected to a vertical scan circuit V.

SUP represents circuits including a power supply circuit for obtaining a voltage source which has been divided into a plurality of voltages from a voltage source and stabilized and a circuit for converting information for a CRT (cathode ray tube) from a host (a processing unit at a higher level) into information for the TFT liquid crystal display.

Figure 12:
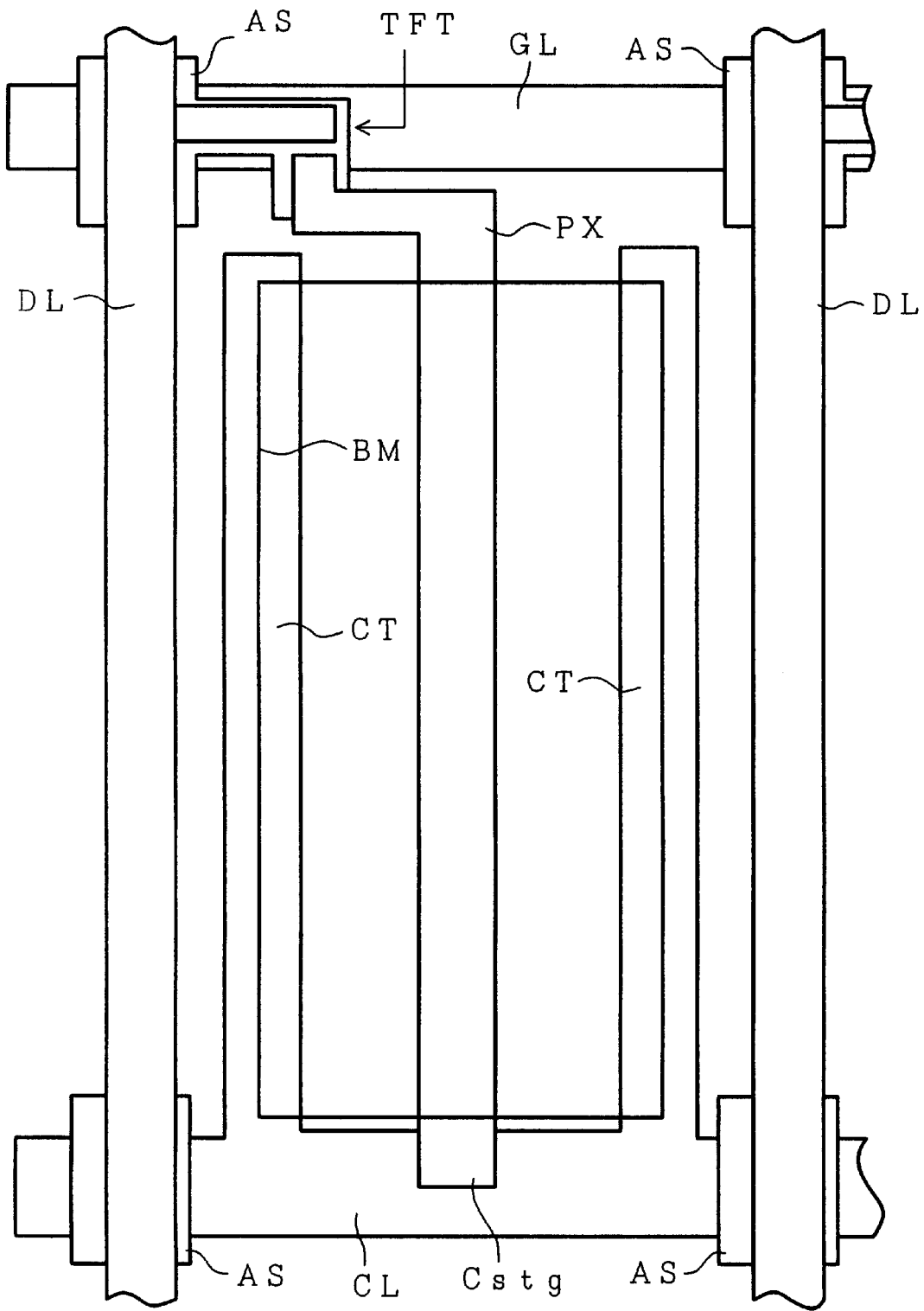
FIG. 12 is a plan view for explaining one pixel and a configuration around the same in an IPS type liquid crystal display which is another example of a liquid crystal display employing the present invention.

FIG. 12 is a plan view for explaining one pixel and a configuration around the same in an IPS type liquid crystal display which is another example of a liquid crystal display employing the present invention. Each pixel is disposed in a region where a scan signal wiring (gate signal line or horizontal signal line) GL, a counter voltage signal line (counter electrode wiring) CL and adjoining two image signal lines (drain signal lines or vertical signal lines) DL cross each other (in a region surrounded by four signal lines).

Each pixel includes a thin film transistor TFT, a storage capacity Cstg, a pixel electrode PX and a counter electrode CT. The scan signal line GL and counter voltage signal line CL extend in the horizontal direction in the figure, and a plurality of them are provided in the vertical direction. The image signal lines DL extend in the vertical direction, and a plurality of the same are provided in the horizontal direction. The pixel electrode PX is connected to the thin film transistor TFT, and the counter electrode CT is integral with the counter voltage signal line CL.

The pixel electrodes PX and counter electrodes CT face each other, and the state of orientation of the liquid crystal LC is controlled by an electric field between each pixel electrode PX and counter electrode CT to modulate light transmitted therethrough, thereby controlling the display. The pixel electrodes PX and counter electrodes CT are configured in the form of comb teeth, and they are electrodes elongate in the vertical direction of the figure.

The number O of the counter electrodes CT in one pixel (the number of comb teeth) must satisfy a relationship expressed by O=P+1 with the number P of the pixel electrodes PX (the number of comb teeth) without fail (O=2 and P=1 in the present embodiment). This is necessary to arrange the counter electrodes CT and pixel electrodes PX alternately and to place the counter electrodes CT adjacent to the image signal lines DL without fail.

This makes it possible to shield an electric line of force from the image signal lines DL with the counter electrodes CT to prevent an electric field between the counter electrodes CT and pixel electrodes PX from being affected by an electric field generated at the image signal lines DL.

The potential of the counter electrodes CT is stable because they are always supplied with potential externally by the counter voltage signal lines CL. Therefore, substantially no fluctuation of potential occurs even through they are adjacent to the image signal lines DL. In addition, since this keeps the pixel electrodes PX in geometric positions apart from the image signal lines DL, the parasitic capacity between the pixel electrodes PX and image signal lines DL is significantly reduced, making it possible to control fluctuation of a pixel electrode potential Vs attributable to the image signal voltage.

Such factors makes it possible to suppress crosstalk (deterioration of image quality referred to as "vertical smear") that occurs in the vertical direction.

The electrode widths Wp, Wc of the pixel electrode PX and counter electrode CT are 6 $\mu$Am each and are set sufficiently greater than 4.5 $\mu$m which is in the excess of the maximum set thickness of the liquid crystal layer as will be described later. Since it is preferable to provide a margin of 20% or more when process variations during manufacture are considered, they are desirably sufficiently greater than 5.4 $\mu$m.

As a result, field components in parallel with the substrate surface applied to the liquid crystal layer become greater than field components in the direction perpendicular to the substrate surface, which makes it possible to suppress increase of the voltage to drive the liquid crystal. The maximum values of the electrode width Wp, Wc of the electrodes are preferably smaller than the interval L between-the pixel electrode PX and counter electrode CT.

The reason is that severe bending of electric lines of force occurs when the interval between the electrodes is small, resulting in an increase in the area where the field components vertical to the substrate surface are greater than the field components in parallel with the substrate surface, which disallows the field components parallel with the substrate surface to be applied to the liquid crystal layer efficiently. Therefore, the interval L between the pixel electrode PX and counter electrode CT must be greater than 7.2 $\mu$m when a margin of 20% is provided. Since the present embodiment is configured with a resolution of 640×480 dots for a diagonal dimension of about 14.5 cm (5.7 inches), the pixel pitch is about 60 $\mu$m. Pixels are divided into two parts to achieve "interval L>7.2 $\mu$m".

The electrode width of the image signal line DL is 8 $\mu$m which is slightly wider than those of the pixel electrode PX and counter electrode CT in order to prevent the breakage of the line; an interval of about 1 $\mu$m is maintained between the image signal line DL and counter electrode CT to prevent shorting; the image signal line DL and the counter electrode CT are respectively formed above and under the gate insulation film to provide them in different layers.

The electrode interval between the pixel electrode PX and counter electrode CT is varied depending on the liquid crystal material used. Since electric field strength to achieve the maximum transmittance depends on the liquid crystal materials and, therefore, the electrode interval is set depending on the liquid crystal material to achieve the maximum transmittance within the range of the maximum amplitude of the signal voltage set by the image signal driving circuit (signal side driver) used. The electrode interval is about 15 $\mu$m when the liquid crystal material mentioned later is used.

In this example of configuration, the black matrix BM is planarly formed on the gate lines GL, counter voltage signal lines CL, the thin film transistors TFT drain lines DL and between the drain liens DL and counter electrodes CT.

Figure 13:
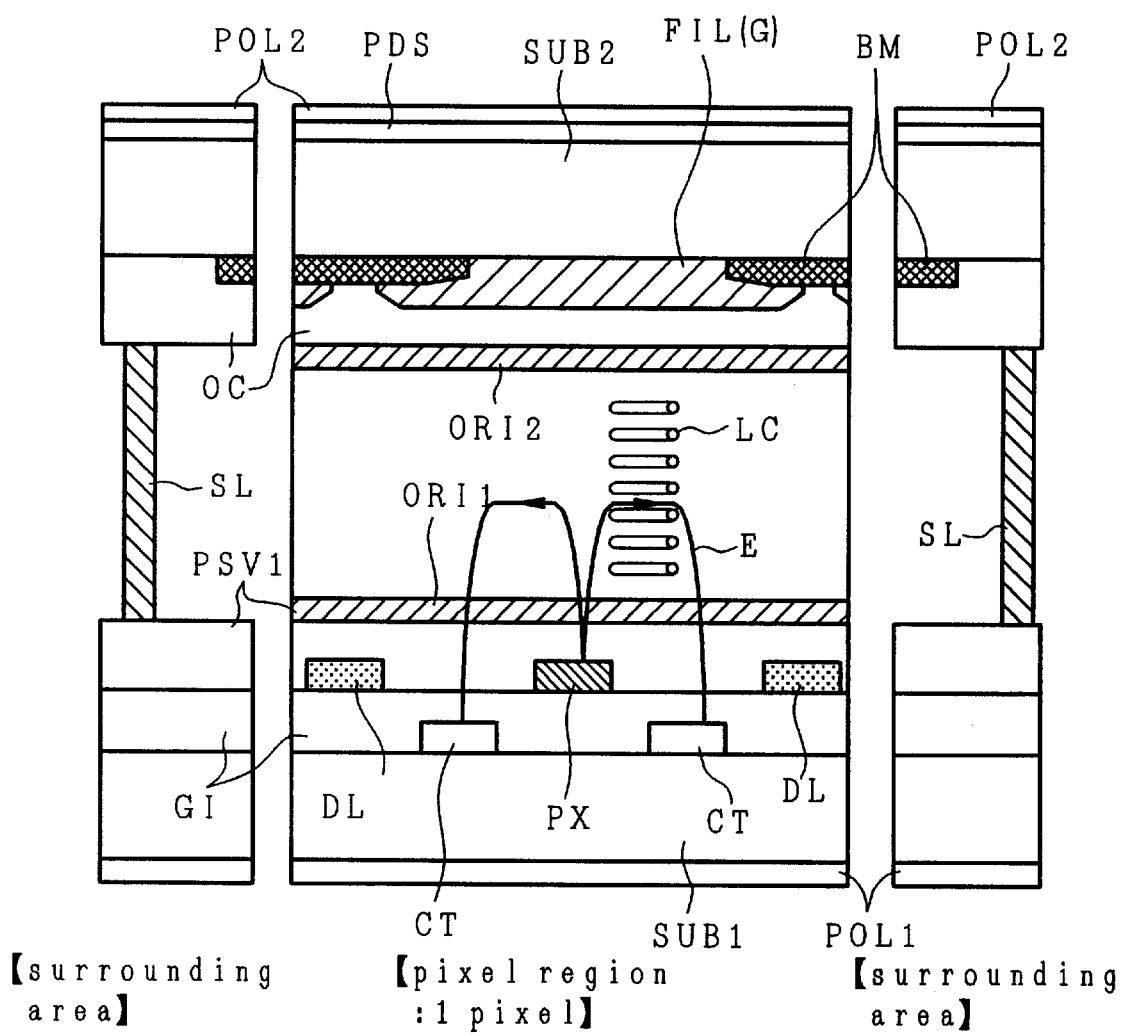
FIG. 13 shows a sectional view in the vicinity of an electrode of one pixel in an image display region of an IPS type liquid crystal display substrate and a sectional view of the periphery of the substrate.

FIG. 13 shows a sectional view in the vicinity of the electrode of one pixel in an image display region of an IPS type liquid crystal display substrate and a sectional view of a region surrounding the substrate. The thin film transistors TFT, storage capacity Cstg (nor shown) and the electrodes CT and PX are formed closer to the lower substrate SUB1 relative to the liquid crystal layer LC as a reference, and the color filter FIL and the pattern of the shading black matrix BM are formed closer to the upper substrate SUB2. The pattern of the black matrix BM may be formed closer to the lower substrate SUB1.

Orientation films OR111, OR112 for controlling the initial orientation of liquid crystal are provided on the inner surface (toward the liquid crystal LC) of the lower substrate SUB1 and upper substrate SUB2, respectively; polarizing plates POL1, POL2 arranged such that their polarization axes are orthogonal (cross Nicols arrangement) are provided on the outer surface of the substrates SUB1, SUB2, respectively; and the sheet of birefringent medium PDS is interposed between the upper substrate SUB2 and upper polarizing plate POL2.

Figure 14:
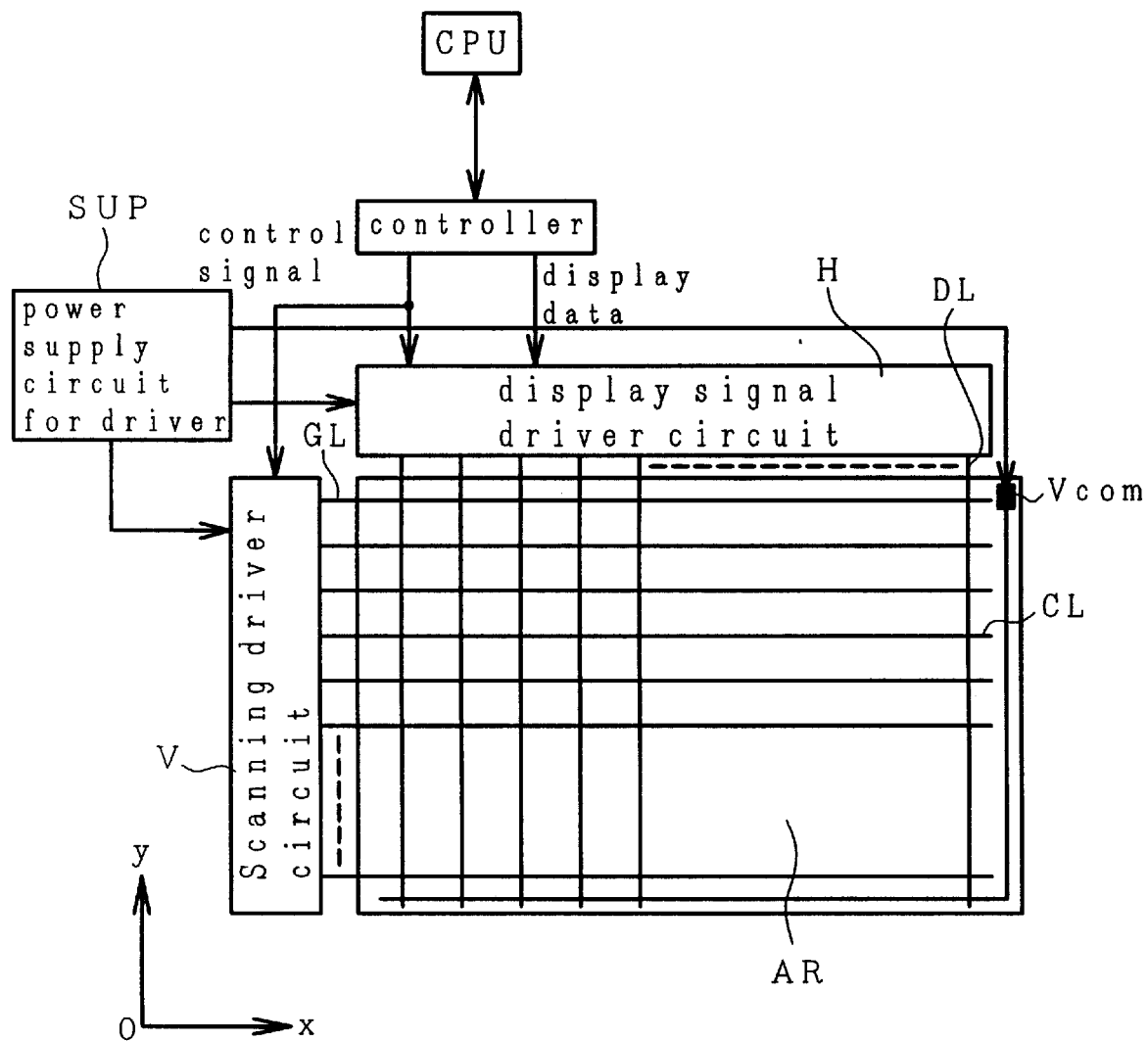
FIG. 14 schematically illustrates peripheral circuits of a liquid crystal panel of the liquid crystal display shown in FIG. 12 employing the present invention.

FIG. 14 schematically illustrates peripheral circuits for the liquid crystal panel of the liquid crystal display shown in FIG. 12 employing the present invention. An image display portion of the liquid crystal panel is formed by a collection of a plurality of pixels arranged in the form of a matrix, and each pixel is configured such that it can independently modulate and control transmitted light from the back light provided on the rear of the liquid crystal panel.

On the lower substrate SUB1 which is one of components of the liquid crystal panel, drain signal lines DL are formed which extend in the x-direction (column direction) in an effective pixel area AR, which extend in the y-direction in insulation from the gate signal lines GL and counter voltage signal lines CL in parallel therewith in the y-direction (row direction) and which are parallel in the x-direction.

A unit pixel is formed in a rectangular area surrounded by the gate signal line GL, counter voltage signal line CL, and drain signal line DL.

The liquid crystal panel is equipped with a vertical scan circuit V and an image signal driving circuit H as external circuits thereof. Said vertical scan circuit V sequentially supplies a scan signal (voltage) to each of the gate signal lines GL, and the image signal driving circuit H supplies an image signal (voltage) to the drain signal lines DL in matched timing.

The vertical scan circuit V and the image signal driving circuit H are supplied with the power source from a liquid crystal driving power supply circuit SUP, and image information from a CPU is input to them after being separated into display data and control signals by a controller.

Figure 15:
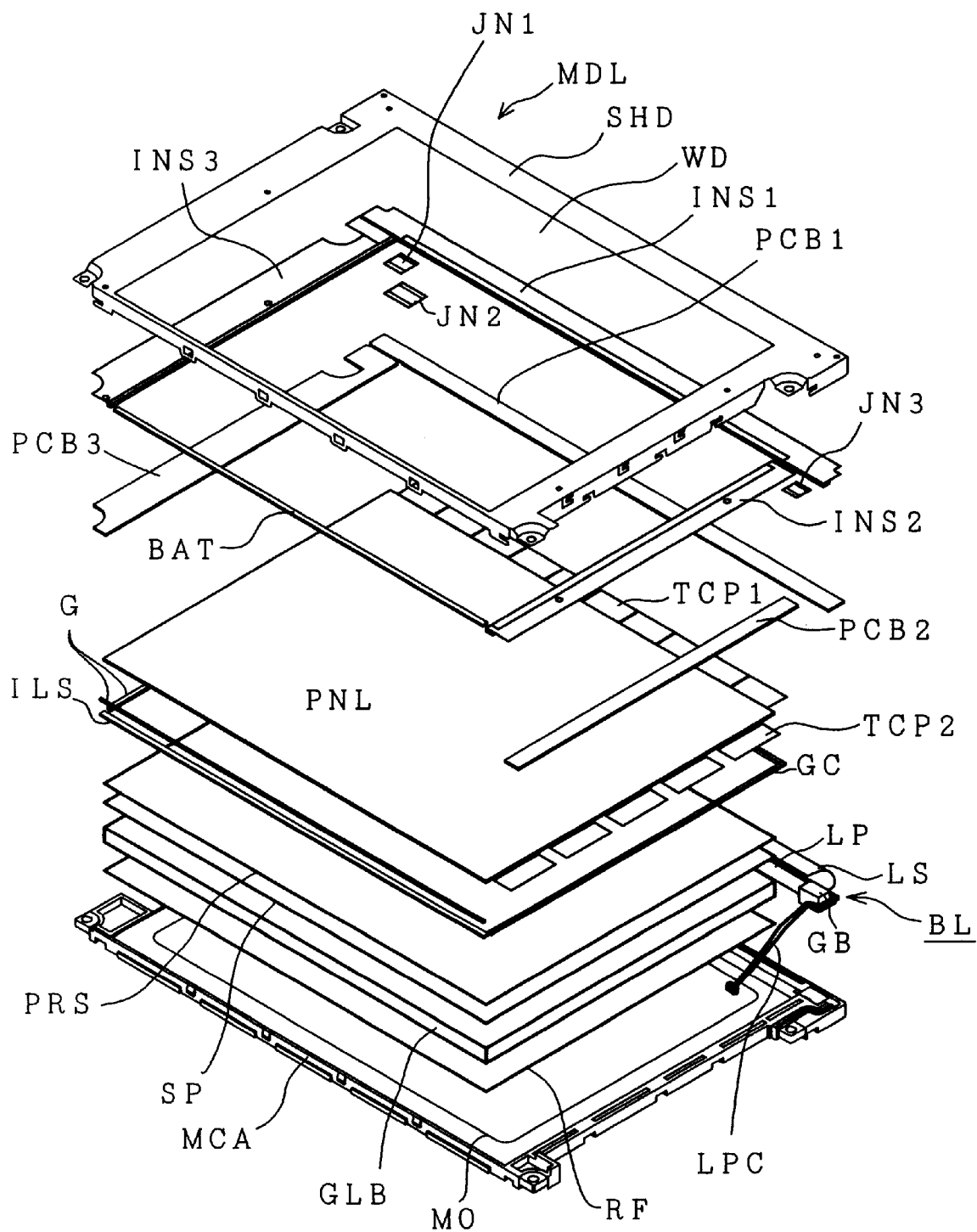
FIG. 15 is an exploded perspective view for explaining a general configuration of the liquid crystal display according to the present invention shown in FIG. 9 or 12.

FIG. 15 is an exploded perspective view for explaining a general configuration of the liquid crystal display according to the present invention shown in FIG. 9 or FIG. 12. The same figure illustrates a specific structure of a liquid crystal display which is formed by integrating a liquid crystal display panel, a circuit board, a back light and other constituent parts (it is designates as "module": MDL).

SHD represents an upper frame consisting of a metal plate (also referred to as "shield case" or "metal frame"); WD represents a display window; INS1 through 3 represent insulation sheets; PCB1 through 3 represent circuit boards (PCB1 represents a circuit board at the drain side and a circuit board for the image signal line driving; PCB2 represents a circuit board at the gate; and PCB3 represents an interface circuit board); JN1 through 3 represent joiners for electrically connecting the circuit boards PCB1 through 3 to each other; TCP1, TCP2 represent tape carrier packages; PNL represents a liquid crystal panel; POL2 represents an upper polarizing plate; PDS represents a sheet of a birefringent medium interposed under the upper polarizing plate POL2; GC represents a rubber cushion; ILS represents a shading spacer; PRS represents a prism sheet; SPS represents a spreading sheet; GLB represents a light guide plate; RFS represents a reflection sheet; MCA represents a lower frame (lower case: mold frame) formed through integral molding; MO represents an opening in MCA; and BAT represents a double-sided adhesive tape, the spread plate members being overlapped in the illustrated arrangement to be assembled into a liquid crystal display module MDL. The region of a light source lamp is omitted from the illustration.

This liquid crystal display (liquid crystal display module MDL) has two kinds of containing and holding members, i.e., the lower frame CA and upper frame SHD and is formed by combining the lower frame MCA in which the insulating sheet INS1 through 3, the circuit boards PCB1 through 3 and the liquid crystal panel PNL are contained and fixed and in which the back light constituted by a light guide plate GLB or the like is contained with the upper frame SHD.

An integrated circuit chip for driving each pixel of the liquid crystal panel PNL is mounted on the circuit board PCB1 for driving image signal lines, and an integrated circuit chip for receiving image signals from an external host and for receiving control signals such as a timing signal and a timing converter (TCON) for processing timing to generate a clock signal and the like are mounted on the interface circuit board PCB3.

The clock signal generated by the timing converter is supplied to the integrated circuit chip mounted on the circuit board PCB1 for driving image signals lines.

The interface circuit board PCB3 and the circuit board PCB1 for driving image signal lines are multi-layer wiring circuit boards, and the clock signal line CLL is formed as wiring on inner layers of the interface circuit board PCB3 and circuit board PCB1 for driving image signal lines.

The drain-side circuit board PCB1 for driving TFTs, gate-side circuit board PCB2 and the interface circuit board PCB3 are connected to the liquid crystal panel PNL using tape carrier packages TCP1, TCP2, and those circuit boards are connected by joiners JN1, 2, 3.

Figure 16:
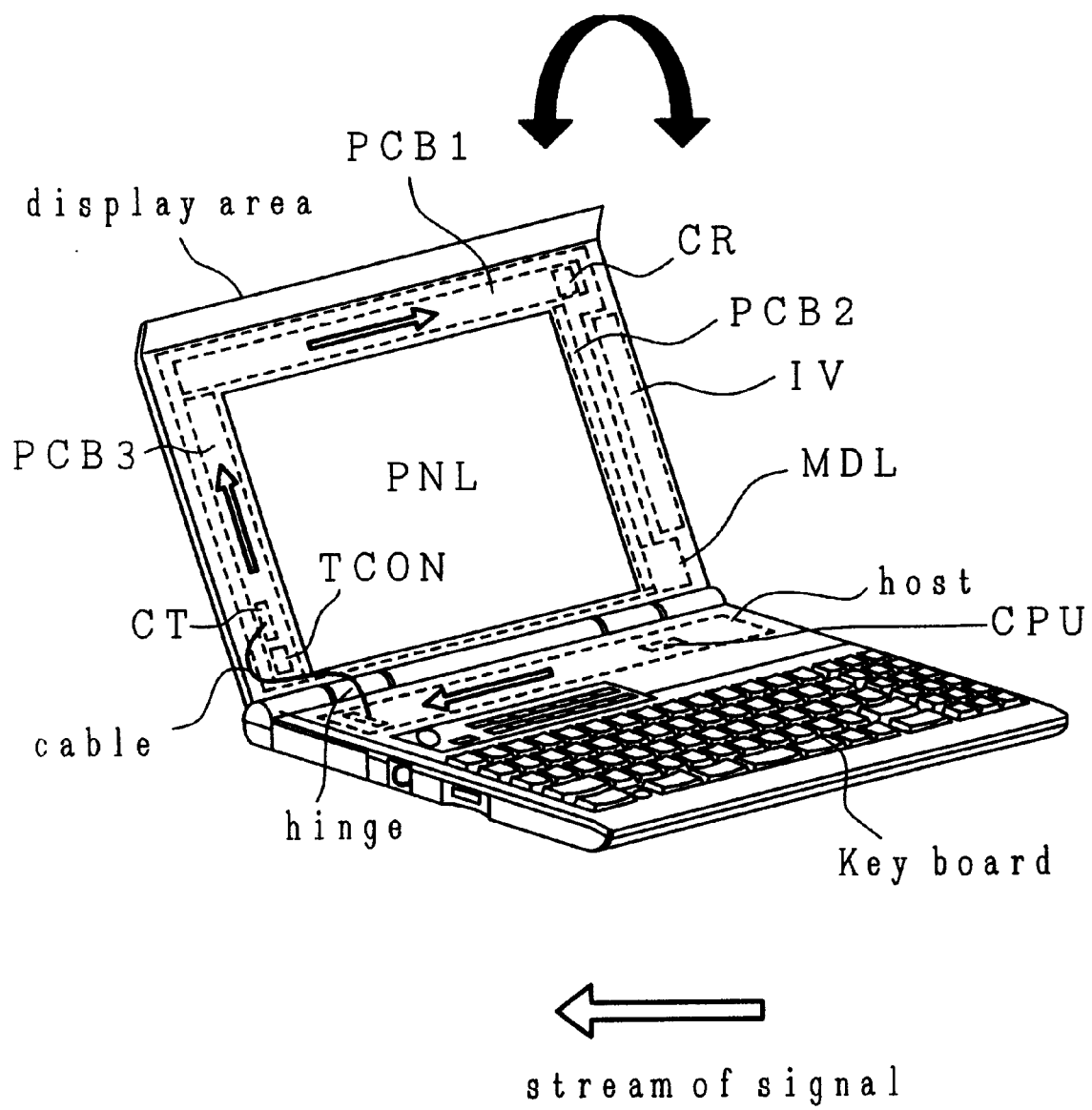
FIG. 16 is an external view of a personal computer for explaining an example of an information processing apparatus in which the liquid crystal display shown in FIG. 15 is mounted.

FIG. 16 is an external view of a personal computer for explaining an example of an information processing apparatus on which the liquid crystal display shown in FIG. 15 is mounted. Reference numbers identical to those in the above-described drawings are associated with like parts; IV represents an inverter power supply for driving a fluorescent tube; and CPU represents a central processing unit at a host.

The personal computer shown in the same figure allows display of images with high visibility in which viewing angle is wide; reduction in transmittance is suppressed; and uniform contrast is achieved with excellent viewing angle characteristics.

As described above, the present invention makes it possible to solve the problem of significant changes in transmittance and displayed colors that occur when the display screen of the liquid crystal display of a normal TN type liquid crystal display is viewed at an angle, the problem of inversion of adjacent gray scale levels during gray shades display and variation in intermediate hues during color display and the problem of any difference in tones in the horizontal direction in an IPS type liquid crystal display.

Since only one sheet of a birefringent medium is used, it is possible to significantly improve transmittance and to provide a bright liquid crystal display having excellent contrast.

What is claimed is:

1. A liquid crystal display comprising:
    a liquid crystal panel including a pair of substrates sandwiching a liquid crystal layer, at least one substrate of said pair of substrates having electrodes for applying voltages to respective pixels;
    a polarizing plate for transmitting light passing through said liquid crystal panel according to a state of orientation of liquid crystal molecules in said liquid crystal layer caused by applying voltages to said electrodes;
    an light source for illuminating said liquid crystal panel from a backside thereof;
    driving circuits for applying a respective voltage in accordance with a display image to each of said electrodes; and
    a birefringent sheet disposed at the outer surface of one of said pair of substrates such that a direction of the maximum contrast or luminance becomes the vertical direction and such that viewing angle characteristics become symmetric in the horizontal direction, said birefringent sheet including a plurality of layers; wherein
    said liquid crystal layer is oriented such that transmittances of said liquid crystal panel in use in the vertical direction and horizontal direction have asymmetric viewing angle dependence and such that the direction of the maximum contrast or luminance is a direction different from either of the vertical and horizontal directions.

2. A liquid crystal display according to claim 1, wherein said birefringent sheet compensates for retardation equal to or greater than half of retardation of the liquid crystal layer.

3. A liquid crystal display according to claim 1, wherein said liquid crystal layer is oriented by each of the directions of orientation of orientation layers formed on inner surfaces of said pair of substrates, said liquid crystal molecules of said liquid crystal layer having a twisted structure when no voltage is applied.

4. A liquid crystal display according to claim 1, wherein a direction of orientation of said liquid crystal layer and a direction of a main optical axis of said birefringent sheet are arranged such that a viewing angle variation of said liquid crystal panel and a viewing angle variation of said birefringent sheet in any viewing angle direction have a relationship between complementary colors.

5. A liquid crystal display according to claim 1, wherein when $\Delta n$ represents the anisotropy of the refractive index of said birefringent sheet and d represents the thickness of said birefringent sheet, the product $\Delta nd$ is within the range from 10 nm to 200 nm and relationships:

$$0.99 < nx/ny < 1.01 \text{ or } 0.99 < ny/nx < 1.01$$

$$0.9 < nx/ny < 1 \text{ or } 0.9 < ny/nz < 1$$

are satisfied where nx and ny represent the refractive indices in the direction of the plane thereof and nz represents the refractive index in the direction of the thickness thereof.

6. A liquid crystal display according to claim 1, wherein said birefringent sheet is disposed such that a direction of a unit vector indicating an average direction of the molecules axes of said liquid crystal molecular when a voltage is applied to one of said electrodes is orthogonal with an optical axis of said birefringent sheet.

7. A liquid crystal display according to claim 1, wherein an angle $\theta$ of said liquid crystal layer is 60°~100°; the product $\Delta nd$ of the anisotropy $\Delta n$ of the refractive index and the thickness d of said liquid crystal layer is 0.2 $\mu$m~0.5 $\mu$m; and a relationship $\Delta nd \times 0.9 < 0.004 \times \theta + 0.0076 < \Delta nd \times 1.1$ is satisfied.

8. A liquid crystal display according to claim 1, wherein one pixel is divided into a plurality of orientation regions having a viewing angle direction.

9. A liquid crystal display comprising:
    a liquid crystal panel including a pair of substrates sandwiching a liquid crystal layer between a pair of substrates at least one of which has a group of electrodes for selecting pixels, said liquid crystal layer being oriented by each of the directions of orientation of orientation layers formed on inner surfaces of said pair of substrates, liquid crystal molecules of said liquid crystal layer having a twisted structure having a twist angle $\theta$ when no voltage is applied, and said twist angle $\theta$ is 60°–100° and a product $\Delta nd$ of the anisotropy $\Delta n$ of the refractive index and the thickness d of said liquid crystal layer is 0.2 $\mu$m–0.5 $\mu$m and a relationship $\Delta nd \times 0.9 < 0.004 \times \theta + 0.0076 < \Delta nd \times 1.1$ is satisfied;
    a polarizing plate for transmitting light passing through said liquid crystal panel according to changes in the state of orientation of liquid crystal molecules forming said liquid crystal layer caused by applying a voltage to said group of electrodes, the axes of polarization of said polarizing plates are substantially orthogonal to pass light through when no voltage is applied;
    a light source for illuminating said liquid crystal panel from a backside thereof;
    driving circuits for applying each voltage in accordance with a display image to each of said electrodes; and
    a birefringent sheet disposed at the outer surface of one of said pair of substrates such that said direction of the maximum contrast or luminance becomes the vertical direction and such that viewing angle characteristics become symmetric in the horizontal direction, said birefringent sheet including a plurality of layers; wherein
    said liquid crystal layer is oriented such that transmittances of said liquid crystal panel in use in the vertical direction and horizontal direction have asymmetric viewing angle dependence and such that the direction of the maximum contrast or luminance is a direction different from either of the vertical and horizontal directions.

10. A liquid crystal display according to claim 9, wherein a direction of orientation of said liquid crystal layer and a direction of a main optical axis of said birefringent sheet are arranged such that a viewing angle variation of said liquid crystal panel and a viewing angle variation of said birefringent sheet in any viewing angle direction have a relationship between complementary colors.

11. A liquid crystal display according to claim 9, wherein when $\Delta n$ represents the anisotropy of the refractive index of said sheet of a birefringent medium and d represents the thickness of the same, the product Δnd is within the range from 10 nm to 200 nm and relationships:

$$0.99 < nx/ny < 1.01 \text{ or } 0.99 < ny/nx < 1.01$$

$$0.9 < nx/ny < 1 \text{ or } 0.9 < ny/nz < 1$$

are satisfied where nx and ny represent the refractive indices in the direction of the plane thereof and nz represents the refractive index in the direction of the thickness thereof.

12. A liquid crystal display according to claim 9, wherein said birefringent sheet is disposed such that a direction of a unit vector indicating an average direction of the molecules axes of said liquid crystal molecular when a voltage is applied to one of said electrodes is orthogonal with an optical axis of said birefringent sheet.

13. A liquid crystal display according to claim 9, characterized in that the optical axis direction of the refractive index of said sheet of a birefringent medium in the thickness direction has a gradient and in that the magnitude of the same is within the range from 5 to 35° to the direction vertical to the plane of said substrate.

* * * * *